United States Patent [19]
Russo et al.

[11] Patent Number: 5,942,724
[45] Date of Patent: Aug. 24, 1999

[54] WIRE CONTAINMENT SYSTEM FOR MOUNTING ON A WALL STRUCTURE

[75] Inventors: Thomas R. Russo, Bristol; Antonio J. Vargas, Tolland, both of Conn.

[73] Assignee: The Wiremold Company, West Hartford, Conn.

[21] Appl. No.: 08/936,103

[22] Filed: Sep. 23, 1997

[51] Int. Cl.⁶ .................................................. H02G 3/04
[52] U.S. Cl. ........................ 174/48; 52/220.1; 220/3.3; 439/211; 174/58; 174/72 A
[58] Field of Search .................... 174/48, 50, 58, 174/60, 49, 72 A, 72 R, 97, 72 C; 439/113, 207, 211, 209, 215; 52/220.1, 220.3, 220.5, 220.7; 220/3.3, 3.9

[56] References Cited

U.S. PATENT DOCUMENTS

| | | |
|---|---|---|
| 2,441,698 | 5/1948 | Gerspacher et al. . |
| 3,175,031 | 3/1965 | Reiner . |
| 3,262,083 | 7/1966 | Gooding . |
| 4,156,795 | 5/1979 | Lacan . |
| 4,163,572 | 8/1979 | Benscoter .............................. 285/284.1 |
| 4,166,195 | 8/1979 | Schwab . |
| 4,308,418 | 12/1981 | Van Kuik et al. . |
| 4,875,881 | 10/1989 | Caveny et al. . |
| 4,951,716 | 8/1990 | Tsunoda et al. . |
| 4,952,163 | 8/1990 | Dola et al. . |
| 5,086,194 | 2/1992 | Bruinsma ................................. 174/48 |
| 5,134,250 | 7/1992 | Caveney et al. . |
| 5,272,282 | 12/1993 | Wiesemann . |
| 5,336,849 | 8/1994 | Whitney . |
| 5,359,143 | 10/1994 | Simon . |
| 5,523,529 | 6/1996 | Holliday ................................. 174/101 |
| 5,594,205 | 1/1997 | Cancellieri et al. ...................... 174/53 |
| 5,594,208 | 1/1997 | Cancellieri et al. ...................... 174/58 |
| 5,614,695 | 3/1997 | Navazo . |
| 5,629,496 | 5/1997 | Navazo . |

FOREIGN PATENT DOCUMENTS

| | | | |
|---|---|---|---|
| 2026782 | 2/1980 | United Kingdom ..................... 174/48 |
| 2083957 | 3/1982 | United Kingdom ..................... 174/48 |

*Primary Examiner*—Kristine Kincaid
*Assistant Examiner*—Dhiru R Patel
*Attorney, Agent, or Firm*—McCormick, Paulding & Huber

[57] ABSTRACT

A raceway for both power and data communication wiring has a base with at least two forwardly open wireway channels that can be covered with covered segments that snap onto the base between outlet boxes of several different styles. These outlet boxes each have a back plate that snaps onto the raceway base so the base can be provided continuously along the wall without having to be cut to fit between outlet box locations. This outlet box back plate is made to receive the outlet box cover in a snap-on mode as well. The device or devices to be put in the outlet box are also capable of being snapped into place.

29 Claims, 6 Drawing Sheets

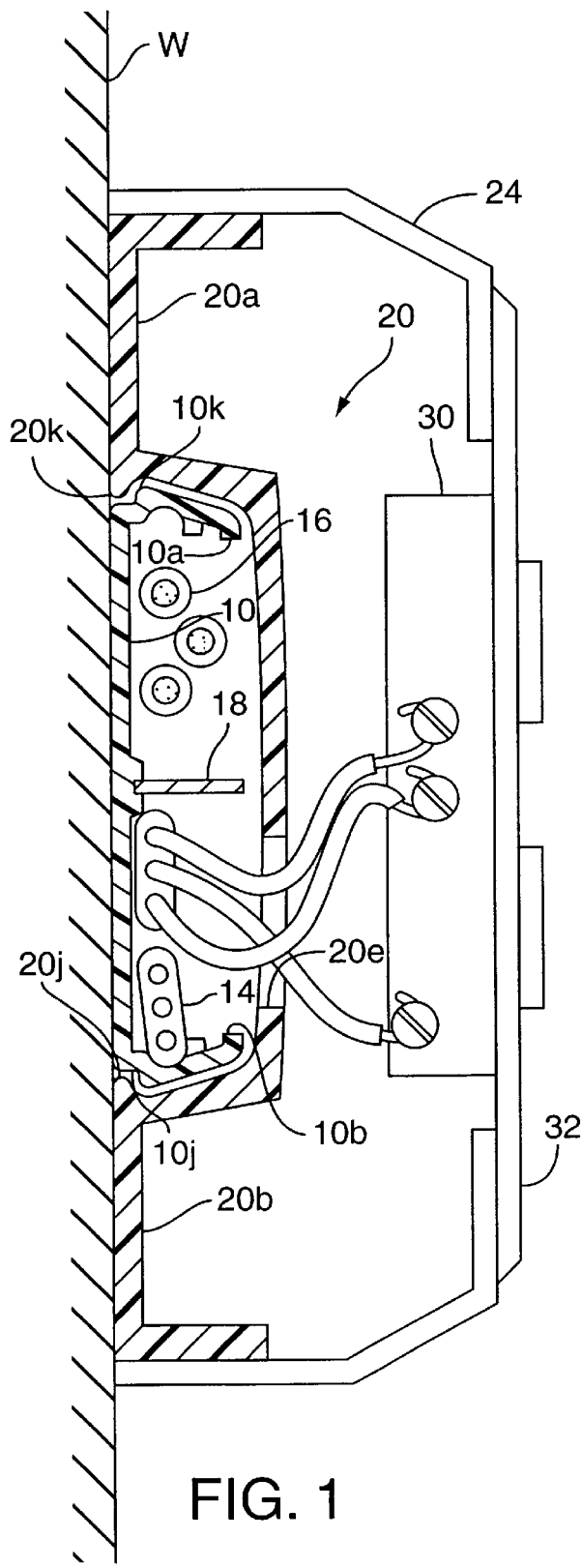
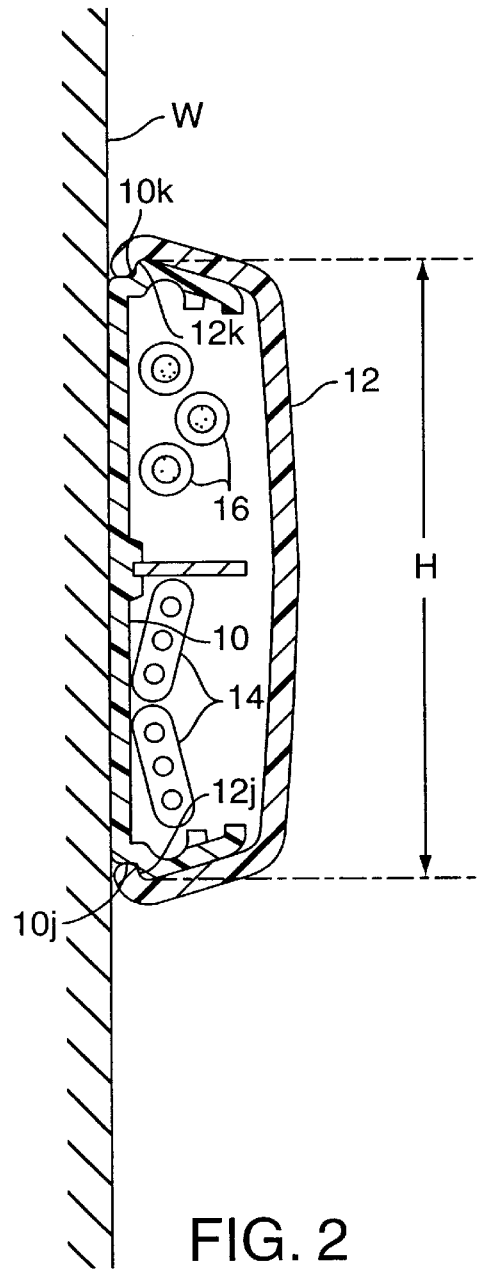
FIG. 1
FIG. 2

WIRE CONTAINMENT SYSTEM FOR MOUNTING ON A WALL STRUCTURE

CROSS-REFERENCE TO RELATED PATENTS AND APPLICATIONS

This Application is related to recently issued U.S. Pat. No. 5,594,208 and 5,594,205 entitled, respectively, MOLDED PLASTIC ELECTRIC OUTLET BOX WITH SNAP-ON BASE AND SNAP-ON FACE PLATE and MOLDED PLASTIC ELECTRIC OUTLET BOX WITH SNAP-ON BASE AND PUSH-IN ELECTRIC DEVICE. Both these disclosures are incorporated by reference in this Application.

BACKGROUND OF THE INVENTION

This invention relates generally to outlet boxes adapted for use with elongated raceways of the type used to carry electrical wiring, both power and data communication, to outlet boxes provided in spaced relationship along such a raceway.

In accordance with the above-mentioned Patents, electrical outlet boxes are intended for use between raceway component sections, each raceway component section typically including a base defining a forwardly open channel, and a cover adapted for snap mounting to the base for covering these wires.

The object of the present invention is to provide a system which includes a continuous raceway base secured to a wall structure and carrying the necessary electrical wiring for servicing electrical outlet boxes that are mountable directly on the channel-shaped base without requiring the base to be cut into sections, thereby allowing greater flexibility in locating outlet boxes along the wall and along such a raceway channel base. The outlet box has a back plate that can be snapped onto the base, and slid along the raceway base to allow last minute locations for the outlet box to be determined by the installer.

SUMMARY OF THE INVENTION

The foregoing object is accomplished in accordance with the present invention and is adapted for mounting on a vertically extending wall structure or the like, said system comprising at least one elongated raceway base that may extend horizontally at a predetermined distance above a floor or may extend vertically or in any other direction along the wall. Typically, the raceway base will be of generally open channel-shape having forwardly projecting legs, that are designed to receive a cover once the wiring has been placed in this channel. The raceway base channel may have a divider to isolate power wiring from data communication wiring.

The present invention permits the mounting of the raceway base in a continuous fashion along the wall structure and then providing at particular locations several spaced outlet boxes over the raceway base. Each outlet box includes a unique back plate that has spaced end portions defining lands which engage the wall structure, and a center raised portion adapted to overlie the forwardly projecting legs of the channel shaped base. This center portion has an opening through which certain selected wires can be passed through the back plate. The outlet box further includes a cover which cooperates with the back plate to define an enclosure for an electrical device or communications jack. This enclosure serves to provide a space for making connection between such an electrical device or jack and selected wires from the raceway channel.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein:

FIG. 1 is a vertical section taken generally through a raceway base arranged horizontally along a wall structure, and shows the outlet box back plate provided over the raceway base, and the cover which may be snap fit to the back plate and which in turn receives a face plate having provision for mounting an electrical outlet device such as a duplex plug.

FIG. 2 is a vertical section taken through a portion of the raceway base of FIG. 1, the base having a raceway cover provided thereon.

DETAILED DESCRIPTION OF FIGS. 1–5

Turning now to the drawings in greater detail, and referring more specifically to FIG. 1, an electrical outlet box is shown installed on an elongated electrical raceway base 10, the same electrical raceway base 10 also being shown in FIG. 2 with a raceway cover 12 snapped over the base to provide a closure for the forwardly open channels defined in the raceway base 10. Such a raceway configuration is well-known in the art and is adapted to contain wiring both of the electrical power type as illustrated at 14 in FIGS. 1 and 2 and cables of the data telecommunication type as indicated generally at 16 in FIGS. 1 and 2. A divider strip 18 is provided in the raceway base 10 to define separate channels for each type of wiring.

Figure 5:
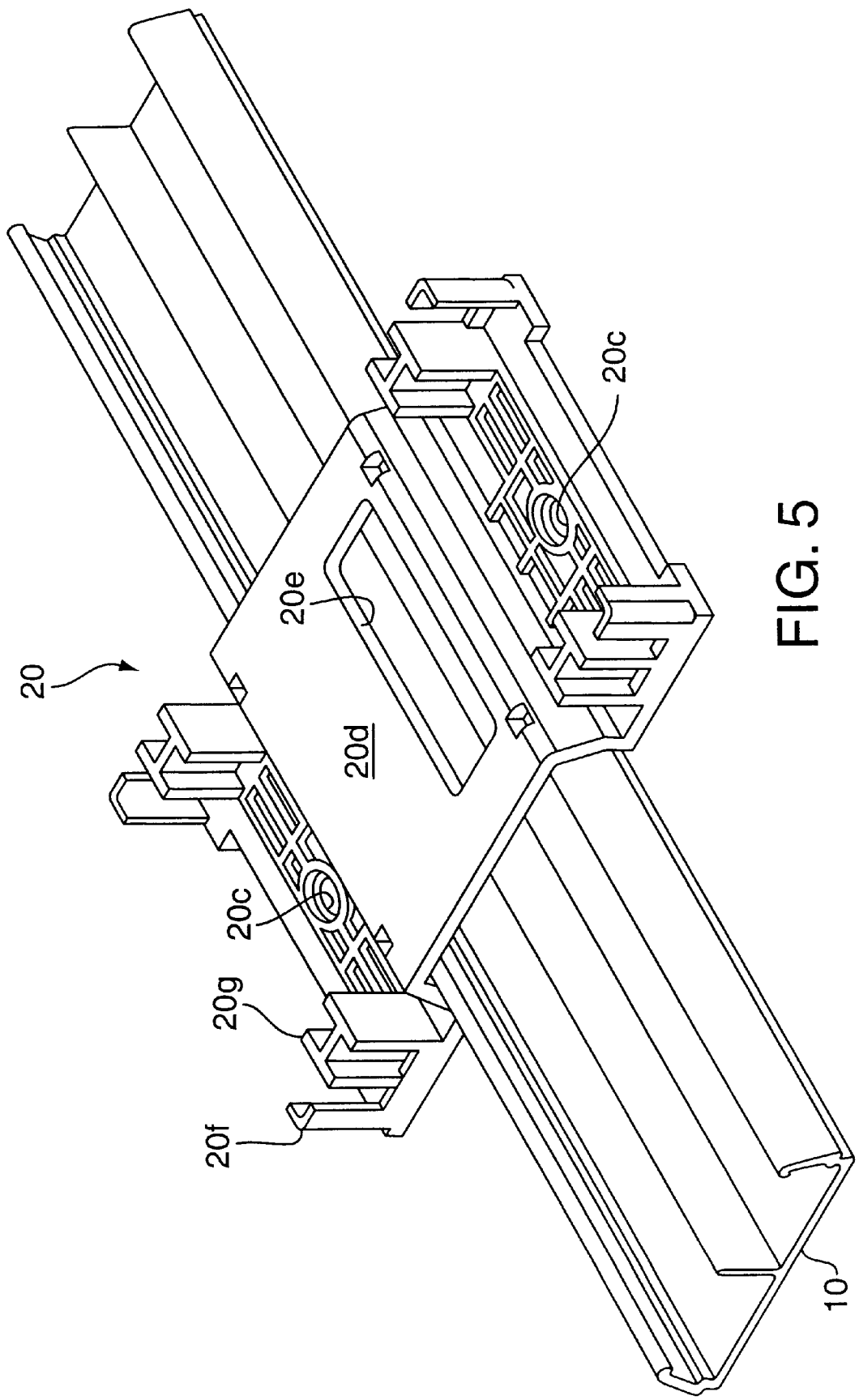
FIG. 5 is a perspective view showing a raceway base with a back plate provided thereon, but without the electrical outlet box cover, and without the wiring and without the electrical device mounted in the outlet box.

FIG. 5 shows the elongated raceway base 10 in somewhat greater detail, and also illustrates an electrical outlet box back plate 20 provided over the base 10 in accordance with the present invention. As best shown in FIG. 1, the back plate 20 includes opposed end portions 20a and 20b which define lands for engaging the same wall structure W that is relied upon for supporting the elongated raceway 10. Conventional fasteners (not shown) may be utilized to secure both the raceway base 10 and electrical outlet box back plate 20 to such a wall structure, and FIG. 5 shows screw openings 20c in the back plate 20 which are provided for this purpose.

The back plate 20 further includes a central portion 20d which is raised as best shown in FIGS. 1 and 5 so as to accommodate the forwardly projecting leg portions 10a and 10b of the channel-shaped base 10. An access opening 20e is provided in this central portion 20d so as to afford a passageway for the wiring provided within the raceway channel 10 to an electrical device 30 which is provided in the electrical outlet box cover, and more particularly, in a face plate which is in turn secured to that cover. FIG. 1 shows the electrical power leads 14 connected to the electrical outlet device 30 in such a way as to take advantage of the enclosure defined between the back plate 20 and the electrical outlet box cover 24.

Figure 3:
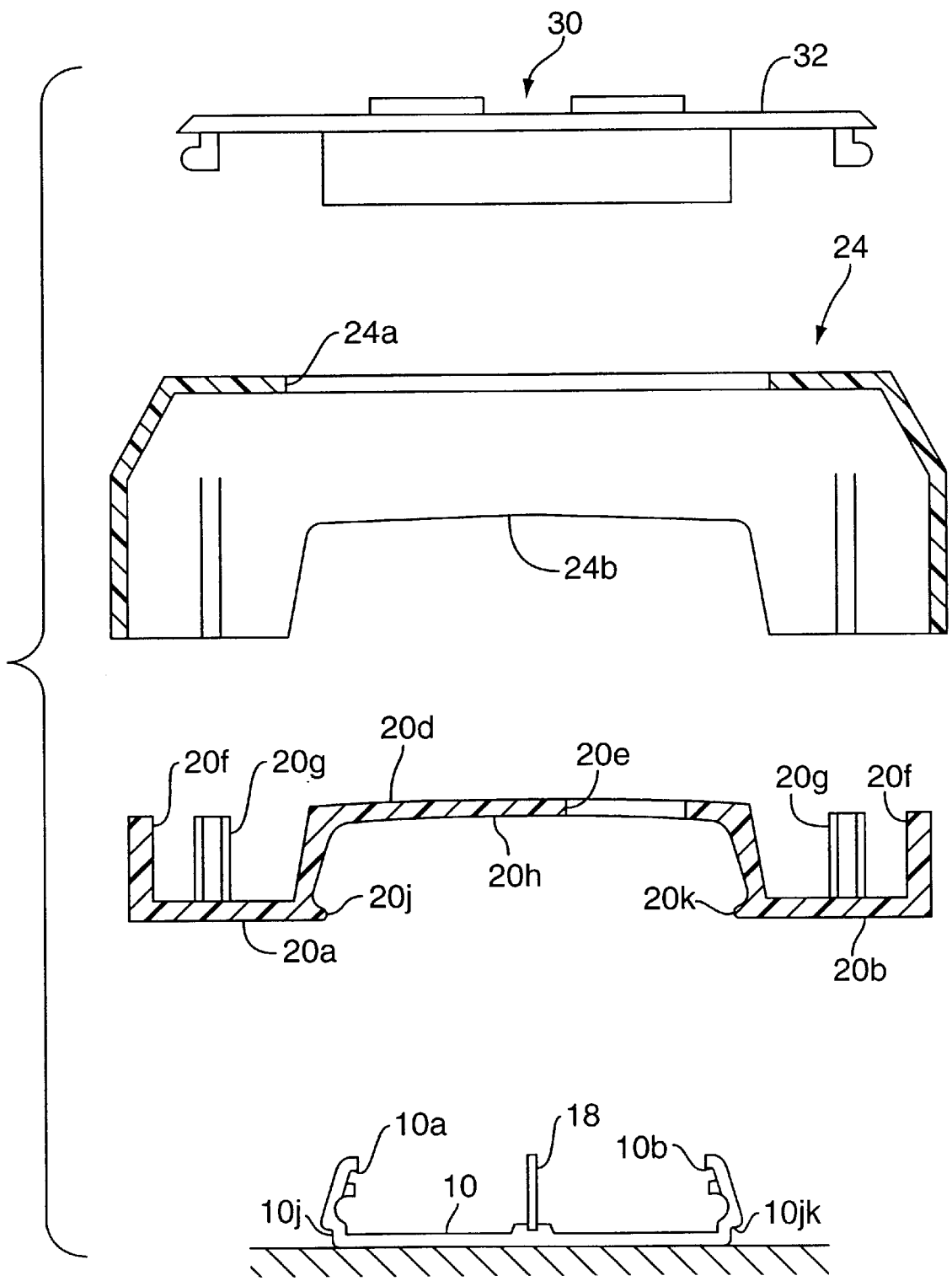
FIG. 3 is an exploded view illustrating the raceway base, the outlet box back plate, the outlet box cover and the face plate with a conventional outlet plug provided therein.

The cover 24 is secured to the back plate 20 preferably in the manner described in the above-mentioned U.S. Pat. No. 5,594,208 which is incorporated by reference herein. As disclosed in the '208 Patent, a generally flat back plate is shown defining upstanding corner posts which are indicated generally at 20f in FIG. 5. The '208 Patent also provides posts or I-beam-shaped cross-sections that are adapted to receive integrally formed ribs provided for this purpose on the inside of the cover 24 so as to permit snap mounting of the cover to the back plate or base, all as described in that '208 Patent. Thus, the cover 24 shown in FIG. 1 and also in FIG. 3 is preferably quite similar to the cover which is shown and described in the above-mentioned '203 Patent. Therefore, no detailed description of the cover portion of the outlet box will be repeated here. However, the cover 24 is a component of the present invention as well.

The cover 24 preferably includes a top opening 24a which is adapted to receive an electrical device, such as the duplex plug indicated generally at 30 in FIGS. 1 and 3. The device 30 is preferably mounted in a face plate, such as that shown at 32 in FIGS. 1 and 3, and the face plate 32 may be similar to that shown in the above-mentioned '208 Patent so as to be fitted in the cover 24 without need for fasteners of any kind. Obviously, a more conventional assembly as between the electrical device 30 and the face plate might also be contemplated within the scope of the present invention. So too, the particular cover configuration need not be identical to that described in the above-mentioned '208 Patent, but may instead comprise a more conventional cover of the type adapted to be secured to the base by conventional fasteners.

It should be noted that the cover 24 includes side openings 24b so as to accommodate the forwardly projecting legs of the channel-shaped raceway base 10a and 10b. It will be apparent that the particular configuration of this cutout 24b is designed to accommodate several different sizes of electrical raceway with which it is to be assembled. The same is true of the back plate 20. The particular shape for the rearwardly open recess 20h of the back plate 20 will be chosen to receive the particular raceway base configuration with which it is to be used. Preferably, the rearwardly open recess 20h includes projecting lips 20j and 20k which are adapted to engage relieved portions of the raceway base in the areas indicated generally at 10j and 10k respectively. Thus the same geometry that is utilized to secure the raceway cover to the raceway base is also utilized to secure the outlet box back plate 20 onto the raceway base 10. As a result of this snap fit of back plate 20 onto the raceway base 10, the back plate is movable slidably along the base, and only when the installer secures the back plate to the wall by fasteners will the final location for the outlet box be determined.

Figure 4:
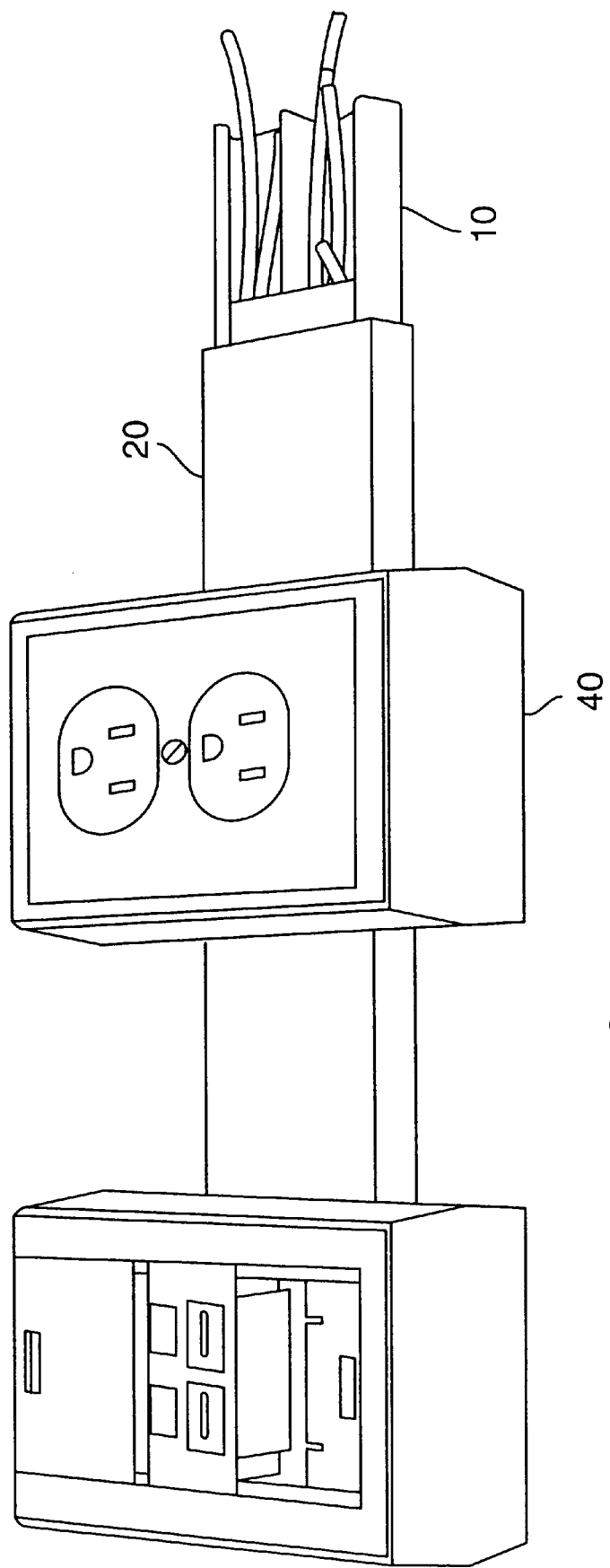
FIG. 4 is a perspective view of the raceway and outlet box as installed on a wall.

FIG. 4 shows in a perspective view, the assembled relationship between the electrical outlet box and the raceway components. The final result looks quite similar to a conventional assembly of raceway base and electrical outlet box. However, the conventional raceway base 10 need not be precut in accordance with the above-described system, and may be secured to the wall structure in a continuous fashion leading to significant gains in the time and effort required for a particular installation. Furthermore, greater flexibility is afforded in the location provided for each of the electrical outlet boxes or other device boxes to be used with such an electrical wiring containment system.

DETAILED DESCRIPTION OF FIGS. 6–8

As mentioned with reference to the FIG. 1–5 embodiment, the raceway base 10 is preferably divided to accommodate both power and data communication wiring in separated wireways. The outlet box of FIGS. 1–5 is shown connected to the power wireway (bottom) of the raceway base as a result of the opening 20e of the back plate 20 being provided at the location shown. If the back plate 20 were reversed, and access opening 20e located in alignment with the top wireway of the raceway base, the same cover 24 could carry data ports such as those shown at 50 in FIG. 6.

Figure 6:
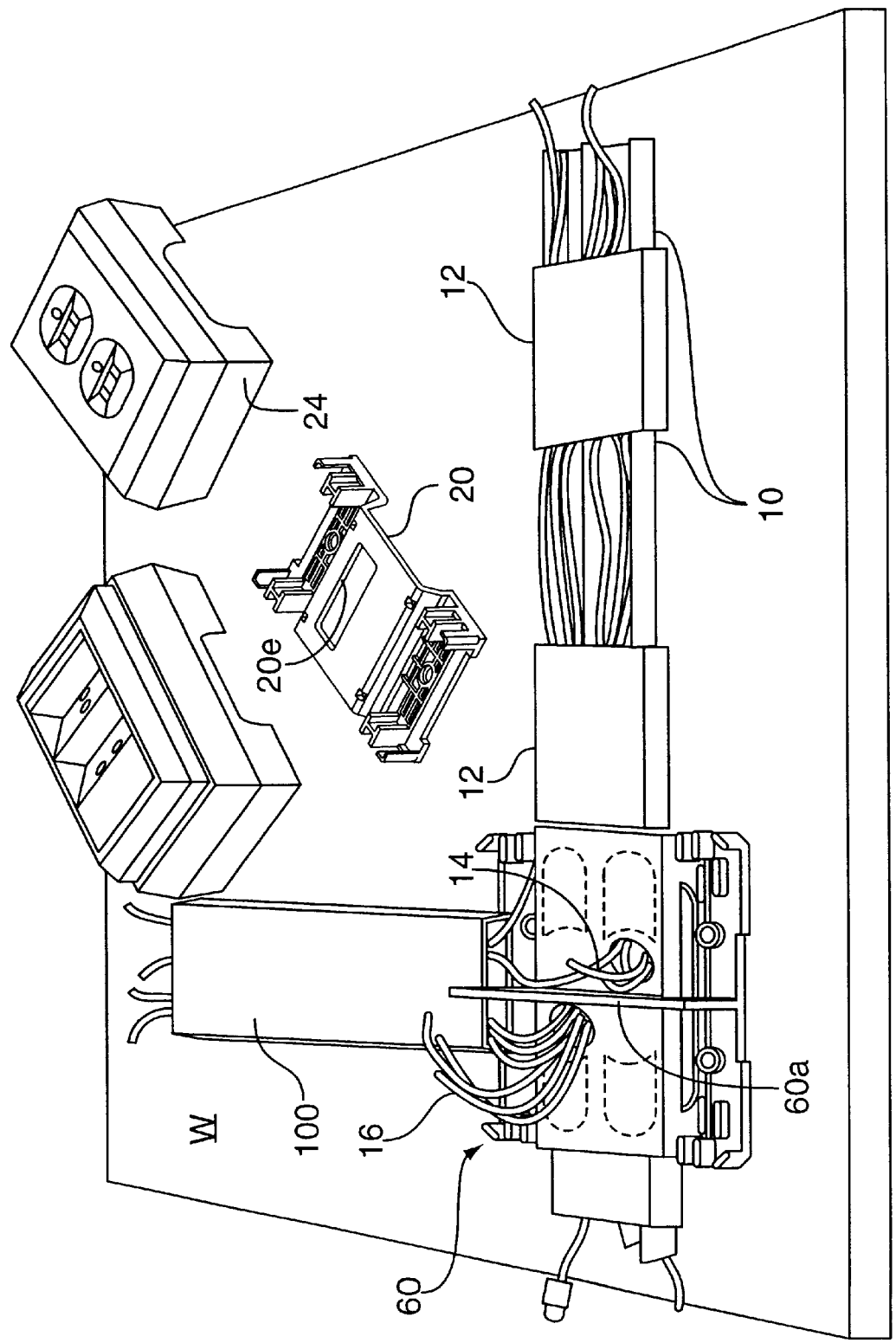
FIG. 6 is a perspective view of a duplex outlet box back plate that is mounted on the raceway base of FIGS. 1–5, and having a divider to provide separate channels for power lines and for data communication lines to a second raceway oriented perpendicular thereto.

Still with reference to FIG. 6, it will be apparent that the same back plate 20 can be used for either the outlet box with a power line duplex plug as shown at 24, or to receive an outlet box with data communication ports as shown at 50 in FIG. 6. In both cases, the same back plate and cover can be used, although the back plate 20 will be reversed to align the opening 20e with the appropriate wireway or channel of the raceway base.

FIG. 6 also shows a double gang back plate 60 that is similar in shape to that of the back plate 20, but which is of double its width, and includes a divider wall 60c. Thus, back plate 60 can be snapped onto the raceway base 10 in the same manner as that of the back plate 20 as described previously. Once positioned properly on the raceway base 10, the back plate can be secured to the wall W by fasteners as described above for the back plate 20.

Except for the divider wall 60a, the back plate 60 is very much like that described previously with reference to FIGS. 1–5. Access openings are provided for on both sides of this divider in the form of knock-out panels. That is, four openings are provided in the double gang back plate of FIG. 6 so that the installer can select which of these four will be used to route both the power leads 14, and the data communication leads 16 from their respective wireway channels in the raceway base 10. These leads can be connected to the outlet box plug and the data ports in the double gang outlet box that is mounted on this double gang back plate 60.

Finally, FIG. 6 also shows how the double gang outlet box can be used to make a T connection between the horizontally extending raceway 10 and a vertically extending raceway 100, that may be identical to the raceway 10. In the set-up shown in FIG. 6, the power leads 14 are routed into one side, or wireway, of the raceway 100 and the data communication wires 16 are routed into the other side. Raceway 100 has a cover and thus is identical to that shown at 10/12 in FIGS. 1–5.

As shown in the drawings, the preferred material for both the base and cover of the raceway is a polymeric material that is molded with top and bottom marginal edge recesses 10j and 10k in the base 10 to receive complementary molded projecting portions 12j and 12k of the cover 12. So too, the outlet box back plate 20 is also molded from a polymeric material to have similar projecting portions 20j and 20k. Thus, both the raceway cover and the outlet box back plate are snapped into place, and can be conveniently slid along the raceway base at assembly.

The outlet box cover 24 is preferably of molded polymeric material also, and can be held to the back plate as a result of the snap-on feature described in detail the prior U.S. Pat. Nos. 5,594,208 and 5,594,205. Further, these patents also disclose the snap-on plate 32, as well as the snap-in fastener feature for retaining the electrical device 30 in the outlet box cover 24. These features are incorporated by reference herein, but are not necessary to achieve the broader aspects of the present invention.

Figure 7:
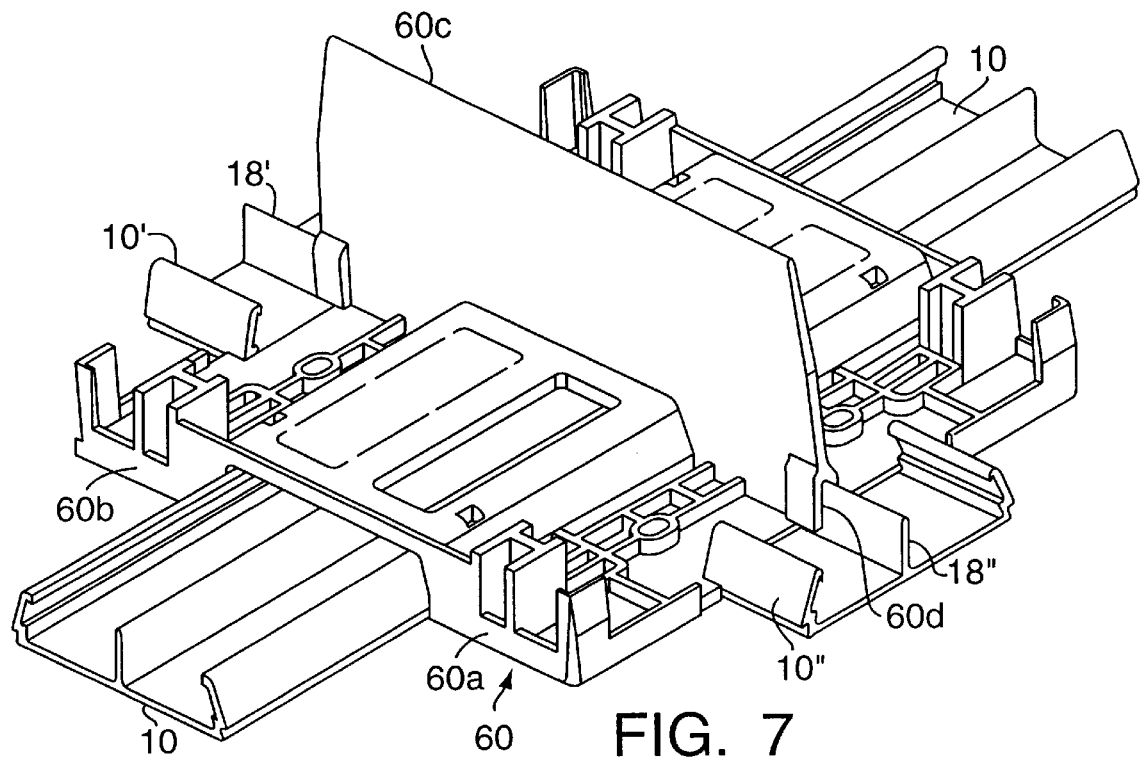
FIG. 7 is an exploded view showing in perspective the duplex outlet box of FIG. 6 without the cover but with the divider.

FIG. 7 shows the double gang back plate 60 mounted on the raceway base 10 and shows that this double gang back plate 60, like the back plate 20 of FIG. 5 has the same sort of spaced end portions, to abut a wall structure, and that these components are snapped together as described previously. Note the lands 60a and 60b of the back plate 60.

Still with reference to FIG. 7, and in addition to the T configuration shown in FIG. 6, still another raceway base 10" can be joined to the back plate 60 as described above with reference to raceway 10' in FIG. 6. Thus, an X raceway configuration is possible with the double gang plate 60.

Figure 8:
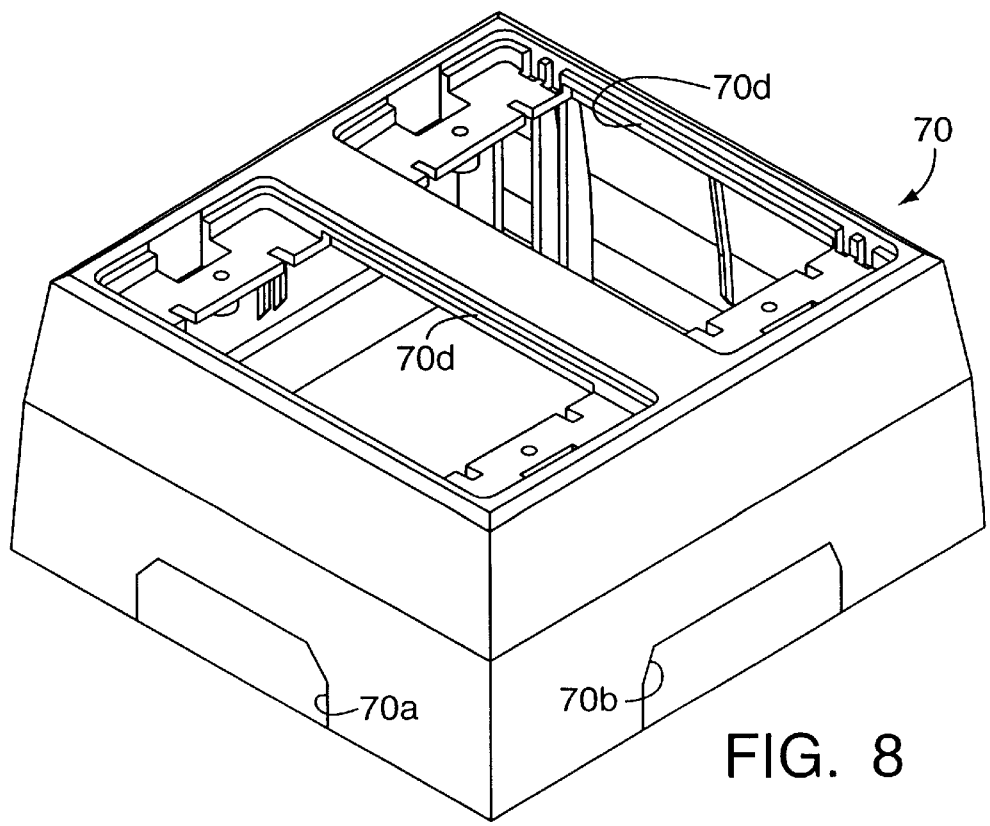
FIG. 8 is a view of the duplex outlet box cover which can be used with the components illustrated in FIG. 7 above.

FIG. 8 shows a double gang box or cover such as that shown in part in FIG. 4. This cover 70 is designed to snap onto the back plate 60 in the same manner as described above for the cover 24 and using single gang back plate 20 with reference to FIG. 3 and the disclosure of U.S. Pat. No. 5,594,208 and 5,594,205.

As described above with reference to FIG. 6, a divider wall 60c is molded integrally in the double gang back plate 60 to isolate the two sides so that power leads can be fed into one side of the cover or box 70 and data communication wiring into the other side. As shown, the raceway base 10" and its opposite raceway base 10' have their internal raceway dividers, 18" and 18' respectively, aligned with the divider wall 60c. This divider wall 60c preferably defines slots for receiving these raceway dividers 18" and 18'.

As shown in FIG. 8, the box or cover 70 has tap openings for receiving power and/or data outlet devices or jacks as shown at 70d. The cover side walls include weakened areas or regions 70a and 70b that allow the installer to configure the outlet box 70 to fit the particular raceway base that is provided along the wall surface, as described previously.

We claim:

1. A wire containment system for mounting on a wall structure and comprising:
   an elongated raceway base having a rear wall adapted to abut a wall structure, said base having a height (H) and including forwardly projecting legs integrally connected to said rear wall of said raceway base to define a forwardly open channel for accommodating wires,
   an outlet box for assembly with said raceway base, said outlet box including a back plate having a height greater than said height of said base, said outlet box back plate having spaced end portions defining lands for engaging the wall structure and said outlet box back plate further including a raised center portion between said end portions and cooperating therewith to define a rearwardly open recess, said recess overlying segments of said forwardly projecting legs of said raceway base, and said center portion of said outlet box back plate defining at least one access opening for receiving selected of said wires among those in the raceway base channel, and
   said outlet box further including an outlet box cover received on said outlet box back plate and cooperating therewith to define an enclosure for one a device to be wired between the device and the selected wires.

2. The wire containment system according to claim 1, wherein said raceway base has a divider to define at least two wireways in said channel, said outlet box back plate being generally symmetrical about a mid-line across said center portion, and said at least one access opening provided off center with respect to said mid-line in order to align said at least one access opening with one or the other of said two wireways in said raceway base channel.

3. The wire containment system according to claim 1, wherein said raceway base includes a relieved portion defined along at least one marginal edge of at least one of said legs, and said olutlet box back plate having projecting portions engageable with said relieved portion of said raceway base to provide for snapping said outlet box back plate on said raceway base whereby said outlet box back plate is restricted to slidable movement longitudinally of said raceway base.

4. The wire containment system according to claim 3, further comprising snap-on raceway cover segments, said cover segments also having projecting portions engageable with said relieved portion of said raceway base to provide for snapping said cover segments on said raceway base so that adjacent end portions of said these cover segments abut said outlet box cover.

5. The wire containment system according to claim 3, wherein said outlet box cover and said outlet box back plate have mutually interacting surfaces that mate with one another to provide a snap-fit of said outlet box cover with said outlet box back plate.

6. The wire containment system according to claim 5, wherein said outlet box cover and said outlet box back plate have mutually interacting surfaces that mate with one another to provide a snap-fit of said outlet box cover on said outlet box back plate.

7. The wire containment system according to claim 2, wherein said raceway base includes a relieved portion defined along at least one marginal edge of at least one of said legs, and said outlet box back plate having projecting portions engageable with said relieved portion of said raceway base to provide for snapping said outlet box back plate on said raceway base whereby said outlet box back plate is restricted to slidable movement longitudinally of said raceway base.

8. The wire containment system according to claim 3, wherein said outlet box cover and said outlet box back plate have mutually interacting surfaces which mate with one another to provide a snap-fit of said outlet box cover with said outlet box back plate.

9. The wire containment system according to claim 8, further comprising snap-on raceway cover segments, said cover segments also having protecting portions engageable with said relieved portion of said raceway base to provide for snapping said cover segments on said raceway base so that said cover segments have adjacent end portions abutting said outlet box cover.

10. The wire containment system according to claim 9, wherein said outlet box cover and said outlet box back plate have mutually interacting surfaces that mate with one another to provide a snap-fit of said outlet box cover on said outlet box back plate.

11. The wire containment system according to claim 7, further comprising snap-on raceway cover segments, said segments also having projecting portions engageable with said relieved portions of said raceway base to provide for snapping said cover segments onto said raceway base so that said cover segments have adjacent end portions abutting said outlet box cover.

12. The wire containment system according to claim 7, wherein said outlet box cover and said outlet box back plate have mutually interacting surfaces which mate with one another to provide a snap-fit of said outlet box cover with said outlet box back plate.

13. The wire containment system according to claim 1, wherein said outlet box back plate is molded from a polymeric material.

14. The wire containment system according to claim 13, wherein said raceway base is also molded from a polymeric material, and wherein said raceway base includes relieved portions defined along marginal edges of said legs, and said outlet box back plate having projecting portions engageable with said relieved portions of said raceway base to provide for snapping said outlet box back plate on said raceway base to restrict said outlet box back plate to slidable movement longitudinally of said raceway base.

15. The wire containment system according to claim 14, further comprising snap-on raceway cover segments, said segments having projecting portions engageable portions with said relieved portions of said base to provide for snapping said cover segments on said raceway base whereby said cover segments have adjacent end portions abutting said outlet box cover, and said cover segments also molded from a polymeric material.

16. The wire containment system according to claim 15, wherein said outlet box cover and said outlet box back plate have mutually interacting surfaces that mate with one another to provide a snap-fit of said outlet box cover with said outlet box back plate, and said outlet box cover being molded from a polymeric material.

17. The wire containment system according to claim 16, wherein said outlet box back plate is of generally rectangular shape with the longer dimension oriented parallel the raceway base, and said outlet box cover including at least two top openings for receiving the device in one of said two top openings, and at least a second device in the other of said at least two top openings, said openings being oriented alongside one another to define a double gang outlet box, said double gang outlet box including an integrally formed divider wall to define two separated enclosures in said double gang outlet box, and said double gang outlet box having a center portion defining at least two access openings.

18. The wire containment system according to claim 17, wherein said raceway base has a divider to define at least two wireways in said raceway base channel, said outlet box back plate being generally symmetrical about a mid-line across said center portion, and said back plate having an access opening off center with respect to said mid-line in order to align said access opening with one or the other of said two wireways in said raceway base channel, said double gang outlet box back plate, more particularly including four access openings which are normally closed, but are defined by lines of weakening so as to be readily opened as required in a particular installation.

19. The wire containment system according to claim 18, wherein said outlet box back plate is of generally rectangular shape such that the longer dimension is of the rectangular shape is oriented perpendicular to a second the raceway base, said outlet box defining a mid-line of symmetry for the outlet box, raceway base and cover, said legs of said raceway base being located generally symmetrically above and below said outlet box mid-line of symmetry.

20. The wire containment system according to claim 19, wherein said raceway base includes relieved portions defined along marginal edges of said raceway base legs, and said outlet box back plate having projecting portions engageable with said relieved portions of said raceway base to provide for snapping said outlet box back plate on said raceway base whereby said outlet box back plate is restricted to slidable movement longitudinally of the base.

21. The wire containment system according to claim 19, further comprising snap-on raceway cover segments, said cover segments also including projecting portions engageable with said relieved portions of said raceway base to provide for snapping said cover segments on said base.

22. The wire containment system according to claim 19, wherein said outlet box cover and said outlet box back plate have mutually interacting surfaces that mate with one another to provide a snap-fit of said outlet box cover with said outlet box back plate.

23. The wire containment system according to claim 21, wherein said outlet box cover and said outlet box back plate have mutually interacting surfaces that mate with one another to provide a snap-fit of said outlet box cover with said outlet box back plate.

24. The wire containment system according to claim 21, wherein said outlet box back plate has a generally rectangular shape so that a longer dimension of the rectangular shape is oriented parallel to said raceway base.

25. The wire containment system according to claim 24, wherein said outlet box back plate is molded of a polymeric material.

26. The wire containment system according to claim 24, wherein said outlet box back plate is molded of a polymeric material.

27. The wire containment system according to claim 26, wherein said raceway base is also molded from a polymeric material.

28. The wire containment system according to claim 27, wherein a plurality of said outlet boxes are provided on said raceway base, said plurality of outlet boxes including both double gang outlet boxes and outlet boxes having a single top opening in its cover.

29. The wire containment system according to claim 28, further characterized by a second raceway base oriented perpendicular to said raceway base, said second raceway base being similar to said raceway base and including a raceway divider wall, said raceway divider wall being oriented in a generally co-planar relationship with said divider wall provided on said double gang outlet box whereby said double gang outlet box provides a T connection with said second raceway.

* * * * *

UNITED STATES PATENT AND TRADEMARK OFFICE
CERTIFICATE OF CORRECTION

PATENT NO. : 5,942,724
DATED : August 24, 1999
INVENTOR(S) : Thomas R. Russo and Antonio J. Vargas It is certified that error appears in the above-indentified patent and that said Letters Patent is hereby corrected as shown below:

In Column 3, line 24: "'203 Patent" should read "'208 Patent".

In Column 5, line 64: "a" should be deleted.

In Column 6, line 10: "olutlet" is a printing error and should read "outlet".

In Column 6, line 21: "these" should be deleted.

In Column 6, Claims 6 and 8 should have been amended as per Examiner's Amendment of January 29, 1999. Claims 6 and 8 should read as follows:

Claim 6. The wire containment system according to claim 3, wherein said outlet box back plate has a generally rectangular shape so that a longer dimension of the rectangular shape is oriented parallel to said raceway base, and said outlet box cover including at least two top openings for receiving the one device in one of said two top openings, and for receiving at least a second device in the other of said at least two top openings, said at least two top openings being oriented alongside one another to define a double gang outlet box.

UNITED STATES PATENT AND TRADEMARK OFFICE
CERTIFICATE OF CORRECTION

Page 2 of 2

PATENT NO.   : 5,942,724
DATED        : August 24, 1999
INVENTOR(S)  : Thomas R. Russo and Antonio J. Vargas It is certified that error appears in the above-indentified patent and that said Letters Patent is hereby corrected as shown below:

(cont. from page 1)

Claim 8. The wire containment system according to claim 7, wherein said outlet box back plate is of generally rectangular shape so that a longer dimension of the rectangular shape is oriented parallel to said raceway base, and said outlet box cover including at least two top openings for receiving the one device in one of said at least two top openings and for receiving at least a second device in the other of said at least two top openings, said at least two top openings being oriented alongside one another to define a double gang outlet box.

In Column 7, line 18: "portions" should be deleted.

In Column 7, line 51: "back plate" should be deleted.

In Column 8, line 1: "the" should be deleted.

In Column 8, Claim 25 should have been cancelled.

Signed and Sealed this

Eleventh Day of July, 2000

*Attest:*

Q. TODD DICKINSON

*Attesting Officer*    *Director of Patents and Trademarks*